(12) United States Patent
Flasza

(10) Patent No.: US 7,889,120 B2
(45) Date of Patent: Feb. 15, 2011

(54) PULSED RADAR LEVEL DETECTION SYSTEM USING PULSE DITHERING TO ELIMINATE INACCURACIES CAUSED BY TANK RATTLE

(75) Inventor: Michael D. Flasza, Schaumburg, IL (US)

(73) Assignee: Magnetrol International, Inc., Downers Grove, IL (US)

( * ) Notice: Subject to any disclaimer, the term of this patent is extended or adjusted under 35 U.S.C. 154(b) by 149 days.

(21) Appl. No.: 12/378,130

(22) Filed: Feb. 11, 2009

(65) Prior Publication Data

US 2010/0201563 A1     Aug. 12, 2010

(51) Int. Cl.
*G01S 13/08* (2006.01)
(52) U.S. Cl. .................... 342/124; 342/175
(58) Field of Classification Search ............ 342/124, 342/175
See application file for complete search history.

(56) References Cited

U.S. PATENT DOCUMENTS

| | | | |
|---|---|---|---|
| 6,462,705 B1 | 10/2002 | McEwan | |
| 6,535,161 B1* | 3/2003 | McEwan | 342/124 |
| 6,626,038 B1 | 9/2003 | Carsella et al. | |
| 7,271,646 B2* | 9/2007 | Flasza | 327/538 |
| 2007/0188374 A1* | 8/2007 | Fehrenbach et al. | 342/124 |
| 2008/0236275 A1* | 10/2008 | Breed et al. | 73/290 V |
| 2010/0201563 A1* | 8/2010 | Flasza | 342/124 |

OTHER PUBLICATIONS

Brumbi, D.; , "Low power FMCW radar system for level gaging," Microwave Symposium Digest., 2000 IEEE MTT-S International , vol. 3, No., pp. 1559-1562 vol. 3, 2000.*

* cited by examiner

*Primary Examiner*—John B Sotomayor
(74) *Attorney, Agent, or Firm*—Wood, Phillips, Katz, Clark & Mortimer

(57) ABSTRACT

A through air level measurement instrument for use in minimizing tank rattle comprises a housing and an antenna secured to the housing. A process adaptor is associated with the antenna and the housing for securing the instrument to a closed tank with the antenna directed into an interior of the closed tank. A control in the housing generates and receives a high frequency signal using an electromagnetic radiating element proximate the antenna. The control comprises an equivalent time sampling circuit including a main oscillator driving a timing circuit controlling timing between transmitted and sample pulses. A noise generator is operatively associated with the main oscillator to randomly modulate timing of the main oscillator. The control minimizes inaccuracies caused by tank rattle.

20 Claims, 6 Drawing Sheets

PULSED RADAR LEVEL DETECTION SYSTEM USING PULSE DITHERING TO ELIMINATE INACCURACIES CAUSED BY TANK RATTLE

CROSS REFERENCE

There are no related applications.

FIELD OF THE INVENTION

This invention relates to a process control instrument and more particularly, to a through air radar level measurement process control instrument.

BACKGROUND OF THE INVENTION

Industrial processes often require measuring the level of liquid or other material in a tank. Many technologies are used for level measurement. With contact level measurement some part of the system, such as a probe, must contact the material being measured. With non-contact level measurement the level is measured without contacting the material to be measured. One example is non-contact ultrasound, which uses high-frequency sonic waves to detect level. Another example is use of high-frequency or microwave RF energy. Microwave measurement for level generally uses either pulsed or frequency modulated continuous wave (FMCW) signals to make product level measurements. This method is often referred to as through air radar. Through air radar has the advantage that it is non-contact and relatively insensitive to measurement errors from varying process pressure and temperature. Known radar process control instruments operate at frequency bands of approximately 6 Ghz or 24 Ghz.

A typical through air radar measurement instrument converts a high frequency electrical signal to an electromagnetic wave. An oscillator is used to create the high frequency electrical signal. An antenna, such as a waveguide or horn, is operatively associated with the oscillator. The waveguide and/or antenna converts the high frequency electrical signal into an electromagnetic wave that can be directed at a target, such as a liquid level surface. An ultra-high frequency (26 GHZ, for example) radiation beam propagates downward from the antenna, is reflected off the surface of the material being measured, and returns to the antenna where the signal is received. The product level is calculated from the total time of propagation of the beam.

In most cases, there is some liquid inside the tank. Normally, radar pulses from the measurement device make a single trip downward to the liquid surface, are reflected by this surface back toward the antenna, and the round trip travel time is an indication of the distance to the liquid surface. This time of flight is used to calculate the level in the tank. The process of sending out a radar pulse and "listening" for the echo is repeated millions of times per second. The transmission rate of repetitive radar pulses is the so-called "pulse repetition frequency" or PRF. Because the radar pulses are very short in duration, for best spatial resolution, it is advantageous to send pulses at the highest PRF possible to improve the detected radar signal-to-noise ratio. Practical radar systems transmit several million radar pulses per second.

Known level measurement instruments, such as in U.S. Pat. No. 6,626,038 use equivalent time sampling (ETS) which uses an expansion factor to effectively reduce the speed of the process to simplify analysis. This requires a high degree of coherence between the transmit and associated receive pulses. Known ETS instruments use a crystal controlled clock and precise delay generation circuitry to maintain a high degree of timing (delay) accuracy in the scanning system. The delay accuracy is assured by careful noise free design of the delay generation circuitry.

Problems can arise when attempting to measure the level in an empty or nearly empty tank. This is a common situation in practical applications. In these situations, all or most of the metal tank bottom is exposed. The tank bottom may be dished or conical in shape, making the tank bottom a very good radar pulse reflector. In fact, in many applications the tank bottom may be a better radar signal reflector than the liquid surface. The strong reflected pulse travels upward and can again be reflected by a metal tank top, which may also be dished, flat, etc., making a very good radar reflector. Radar pulses transmitted into such a scenario may well bounce off the top and bottom multiple times before dying out. These situations, where radar pulses make many round trips between the tank top and bottom, are referred to as "tank rattles". Tank rattle can have a disastrous effect on pulse radar level measurement. If the "rattles" exists long enough so that they survive into the next repetitive PRF cycle, then the rattles that have made multiple trips can be confused with reflections that made only one such trip. The rattles can obliterate, and render useless, the detected radar signal needed to measure level. FIG. 7 of the drawings illustrates the effect of tank rattles in an empty tank. The signal trace should consist of a reference or fiducial pulse followed by a relatively flat baseline, then a large pulse indicating the tank bottom. Instead, the empty tank produces a busy and unusable waveform literally filled with "false echoes". The false echoes are illustrated by the extraneous peaks in the waveform and are not actual targets, but rather are rattles. Such a waveform cannot infer any information as to what may be in the tank. It certainly cannot indicate that the tank is empty. To eliminate problems of tank rattle, it is necessary for the radar receiver to differentiate between echoes that are related to the most recent transmitted pulses, and those that are related to the pulse sent from an earlier PRF cycle.

The present invention is directed to overcoming one or more of the problems discussed above, in a novel and simple manner.

SUMMARY OF THE INVENTION

In accordance with the invention there is provided an improved through air radar process control instrument.

Particularly, the process control instrument dithers timing between successive transmitted pulses.

In accordance with one aspect of the invention, there is provided a through air level measurement instrument for use in minimizing tank rattle comprising a housing and an antenna secured to the housing. A process adaptor is associated with the antenna and the housing for securing the instrument to a closed tank with the antenna directed into an interior of the closed tank. A control in the housing generates and receives a high frequency signal using an electromagnetic radiating element proximate the antenna. The control comprises an equivalent time sampling circuit including a main oscillator driving a timing circuit controlling timing between transmitted and sample pulses. A noise generator is operatively associated with the main oscillator to randomly modulate timing of the main oscillator. The control minimizes inaccuracies caused by tank rattle.

It is a feature of the invention that the noise generator comprises a dither oscillator. The dither oscillator may generate a noisy square wave of about 500 KHz. The square wave may include dither in a range of about 20 to 50%.

It is another feature of the invention that the timing circuit comprises a delay lock loop. The delay lock loop may be operatively associated with a sampling detector to perform the function of equivalent time sampling.

It is a further feature of the invention that the radiating element comprises an oscillator circuit including microstrip resonators.

It is a further feature of the invention that the antenna comprises a horn antenna.

There is disclosed in accordance with another aspect of the invention the method of eliminating tank rattle inaccuracies in a through air radar level sensor comprising: providing a housing, with an antenna secured to the housing and a process adapter associated with the antenna and the housing for securing the sensor to a closed tank with the antenna directed into an interior of the closed tank; and generating and receiving a high frequency signal using an electromagnetic radiating element proximate the antenna, comprising providing an equivalent time sampling circuit including a main oscillator driving a timing circuit controlling timing between transmitted and sampled pulses, and generating noise to the main oscillator to randomly modulate timing of the main oscillator to minimize inaccuracies caused by tank rattle.

There is disclosed in accordance with yet another aspect of the invention a through air radar level sensor for use in minimizing tank rattle comprising a housing and an antenna secured to the housing. A process adaptor is associated with the antenna and the housing for securing the sensor to a closed tank with the antenna directed into an interior of the closed tank. A control generates and receives a high frequency signal using an electromagnetic radiating element proximate the antenna. The control comprises an equivalent time sampling circuit including a main oscillator driving a timing circuit providing precise timing between transmitted and sample pulses in a cycle. A noise generator is operatively associated with the main oscillator providing dithering of transmit pulses of different cycles to minimize inaccuracies caused by tank rattle.

Further features and advantages of the invention will be readily apparent from the specification and from the drawings.

DETAILED DESCRIPTION OF THE INVENTION

Figure 1:
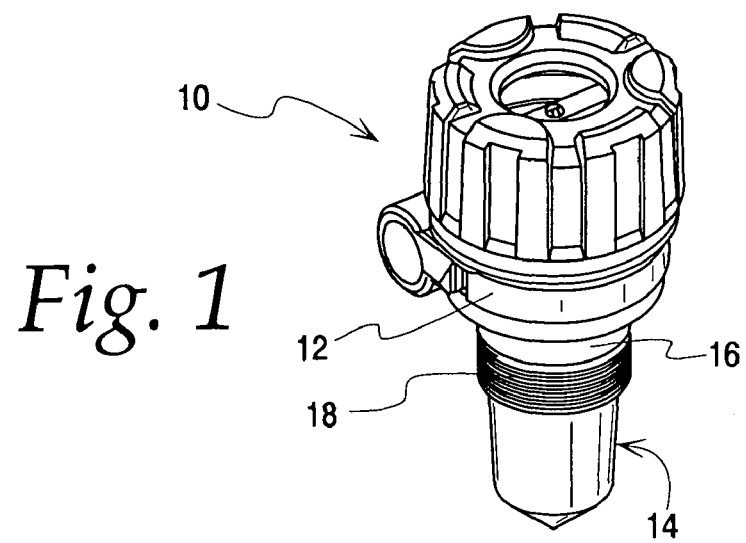
FIG. 1 is a perspective view of a process control instrument in accordance with the invention.

Referring to FIG. 1, a process control instrument 10 according to the invention is illustrated. The process control instrument 10 uses micro power impulse radar (MIR) in conjunction with equivalent time sampling (ETS) and ultra-wide-band (UWB) transceivers for measuring a level using time domain reflectometry (TDR). Particularly, the instrument 10 uses through air radar for sensing level.

In conventional radar systems, the timing between pulses, the PRF, is usually generated by an accurate, repetitive time base such as a crystal oscillator. When the timing between successive PRF cycles is highly accurate, i.e., correlated, the system is unable to discern between echoes from the current transmitted pulses and those that rattle in the tank long enough to be detected in a subsequent PRF cycle. The instrument 10 solves the problem of tank rattle by randomizing, or "dithering" the timing between successive transmitted pulses, while maintaining precise timing between transmit pulses and associated receive pulses.

Figure 2:
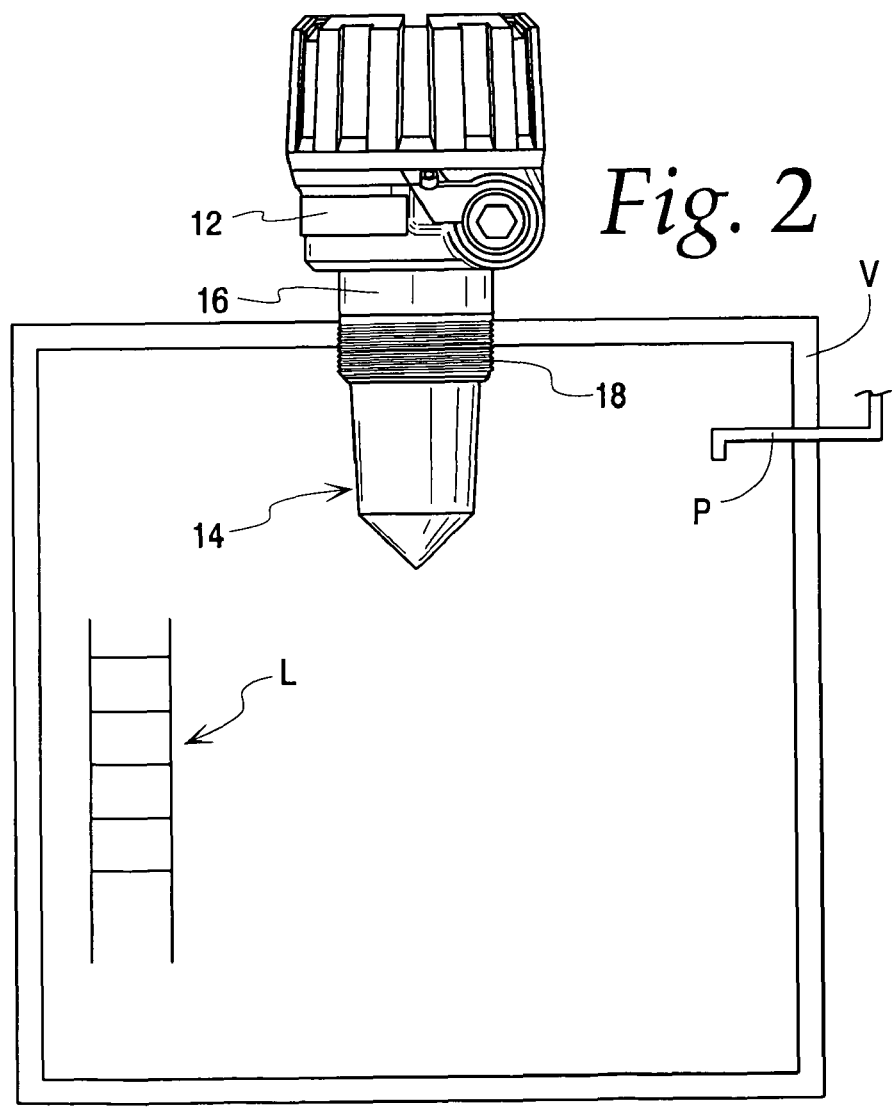
FIG. 2 is an elevation view of the process control instrument of FIG. 1 mounted in a process vessel

The process control instrument 10 includes a control housing 12, an antenna 14, and a process adapter 16 for connecting the antenna 14 to the housing 12. The process adapter 16 is typically mounted to a process vessel V, see also FIG. 2, using a threaded fitting 18. Alternatively, a flange may be used. The illustrated process vessel comprises a closed tank. With a closed tank, particularly one of metal, tank rattle, discussed above, can cause problems in measurement.

The instrument 10 uses pulse-burst radar technology with ETS circuitry. Short bursts of microwave energy are emitted and subsequently reflected from a surface. The distance is calculated by the equation $$D = \text{(velocity of EM propagation)} * \text{transit time(round trip)}/2.$$

Level is then calculated by applying a tank height value. ETS is used to measure the high speed, low power electromagnetic (EM) energy. The high speed EM energy (1,000 ft/µs) is difficult to measure over short distances and at the resolutions required in the process control industry. ETS captures the EM signals in real time (nanoseconds) and reconstructs them in equivalent time (milliseconds), which is much easier to measure. ETS is accomplished by scanning the vessel to collect thousands of samples. The round trip event on a 65 ft. tank takes only 133 nanoseconds in real time. After it is reconstructed in equivalent time it measures 200 milliseconds.

Circuits which use MIR in conjunction with ETS are known and may be in accordance with the teachings of McEwan U.S. Pat. Nos. 5,345,471 and 5,609,059, the specifications of which are hereby incorporated by reference herein.

Figure 3:
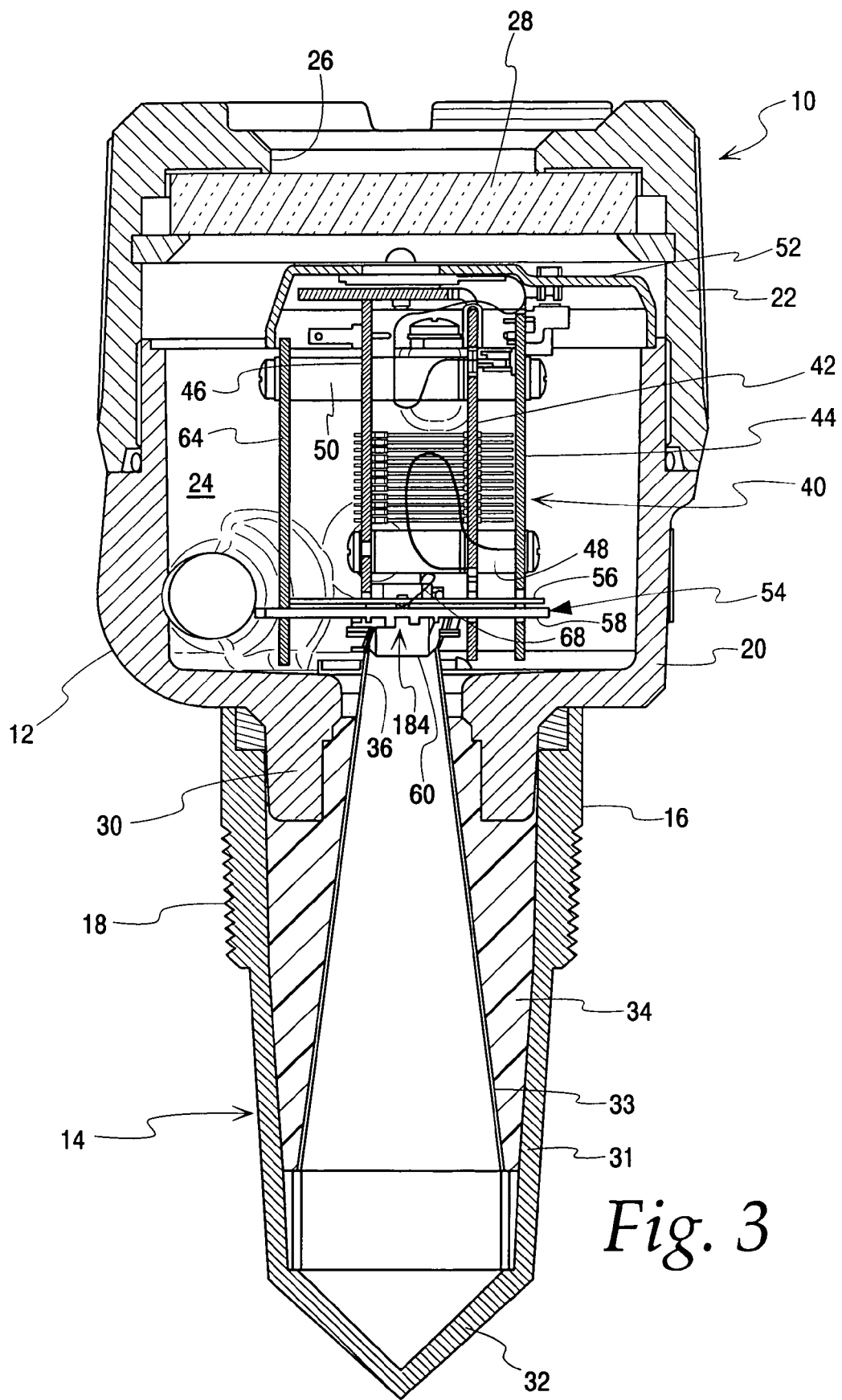
FIG. 3 is a sectional view of the process control instrument of FIG. 1.

Referring particularly to FIG. 3, the housing 12 comprises a base 20 and a cover 22 threaded to the base 20 to define an enclosed space 24. The cover 22 has a top opening 26 closed by a glass plate 28. A bottom of the base 20 includes a downwardly depending neck 30. The neck 30 is receivable in the process adaptor 16. The process adapter 16 is generally cylindrical and connects to an antenna housing 31 narrowing downwardly from the housing 12 to a conical closed end 32. In the illustrated embodiment, the process adapter 16 and antenna housing 31 comprise a unitary structure.

The antenna 14 comprises an antenna horn 33 embedded in potting compound 34 within the antenna housing 31 and process adapter 16. The potting compound 34 also serves to permanently and rigidly attach the process adaptor 16 to the housing base 20. The antenna horn 33 includes an upper feed end 36 that projects into the housing space 24.

A control 40 in the housing space 24 generates or receives a high frequency signal, as described below. The control 40 comprises a mounting bracket 42 fixedly secured to the base 20 in any known manner. First and second main circuit boards 44 and 46 are fixedly secured to the bracket 42 using fasteners 48 and 50, respectively. A bezzle 52 is secured in the housing and is electrically connected to the first main circuit board 44. A rotating RF transceiver circuit assembly 54 is rotationally mounted to the mounting bracket 42 and is electrically connected to the first main circuit board 44 by a flexible cable (not shown).

The rotating transceiver circuit assembly 54 comprises a plate 56 connected to a transceiver circuit board 58. An antenna feed bearing 60 extends downwardly from the transceiver circuit board 58 and is sized to be telescopically received in the antenna horn feed end 36. The feed bearing 60, and thus the transceiver circuit board 58, are free to rotate about a vertical axis, guided by the antenna horn 33.

The main circuit boards 44 and 46 include electrical circuitry for supplying power to the control 40, and a control circuit to provide measurement functions, display control, configuration, general operation and the like for sensing level and interfacing with other peripherals and control equipment The transceiver circuit board 58 contains the necessary circuitry to produce a microwave signal, transmit the signal to a liquid or other surface, receive and process the radar return signal into a so-called "video" wave form from which the locations of the radar echoes can be determined. In the illustrated embodiment of the invention, the main circuit boards circuitry generates and sends to the transceiver circuit board 58 control signals such as time variable gain, window, run/stop and end of ramp that control the radar scanning process.

Figure 4:
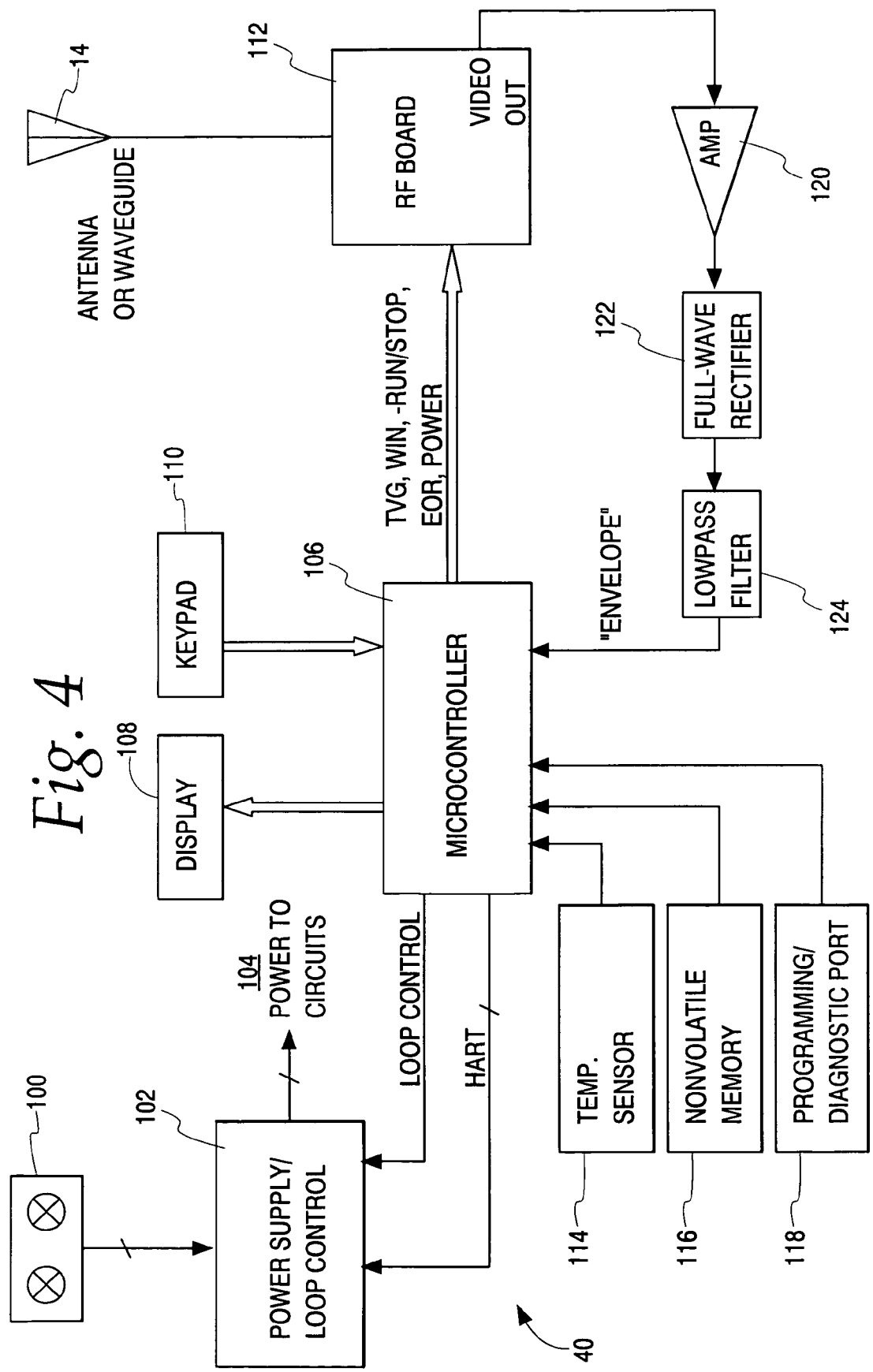
FIG. 4 is a block diagram of circuitry of the process control instrument of FIG. 1.

Referring to FIG. 4, the control 40, provided on the circuit boards 44, 46 and 58, is illustrated in block diagram form. Power into the control 40 is received at a terminal block 100. The instrument 10 comprises a two-wire loop-powered device, as is known. The terminal block 100 is connected to a power supply/loop control block 102. This block 102 receives the power from the 24 volt two-wire loop and converts it into the necessary DC power supply to run the electronics, as indicated at 104. In the case of a two-wire device, a 4-20 mA current loop is used to indicate the value of the process variable, in this case level. For this purpose, the loop control function of the block 102 receives a Loop Control signal from a microcontroller 106. The Loop Control signal is a pulse-width-modulated signal that the power supply/loop control block 102 processes into a 4-20 mA current loop output, as is conventional and well known. Many devices of this type also implement the well known HART digital communications protocol. The power supply/loop control block 102 also includes the necessary circuitry to implement the HART protocol, and communicate this information to the microcontroller 106 on additional hardware leads, as shown. As will be apparent, the present invention can be used with direct powered level measurement instruments.

The microcontroller 106 is connected to a display 108 such as an alpha numeric display for user interface. The display 108 indicates the current operational status and process information (level, etc.), at most times, but is also used for instrument setup, trouble shooting, diagnostics, etc. A keypad 110 is connected to the microcontroller 106 and is used in connection with the display 108 for setup, device commissioning, etc.

All measurement functions, the display control, configuration, general operation, and the like, are under the control of the microcontroller 106 and its firmware. In the illustrated embodiment of the invention, the microcontroller 106 controls the current loop, watches for HART communication, refreshes the display 108, reads keypad input from the keypad 110 and controls operation of an RF board 112, which is in turn associated with the antenna 14. Particularly, the microcontroller 106 acquires and stores an "envelope" wave form which is an analog signal representative of the radar signature from the RF board 112, as described below. The microcontroller 106 interfaces with other peripherals such as a temperature sensor 114, non-volatile memory 116 and a programming/diagnostic port 118.

The RF board 112 contains the necessary microwave circuitry to produce a microwave signal, transmit the signal to the surface of the material to be measured, and receive and process the radar return signal to a so-called video wave form from which the locations of radar echoes can be determined. The microcontroller 106 generates and sends to the RF board 112 control signals such as time variable gain (TVG), a window (WIN) calibration parameter and run/stop and end of ramp (EOR), comprising signals that control the radar scanning process. A video out of the RF board 112 is connected to an amplifier 120, which is in turn connected to a full wave rectifier 122 and low pass filter 124 to create the envelope signal discussed above. These three blocks combine to take the "video" signal output of the RF board 112, which is a signal in the 18 kh range, and by rectifying and filtering it, transforming it into an "envelope" signal, which is a signal of lower frequency content that is more suitable for digitization by an analog/digital converter in the microcontroller 106.

Figure 5:
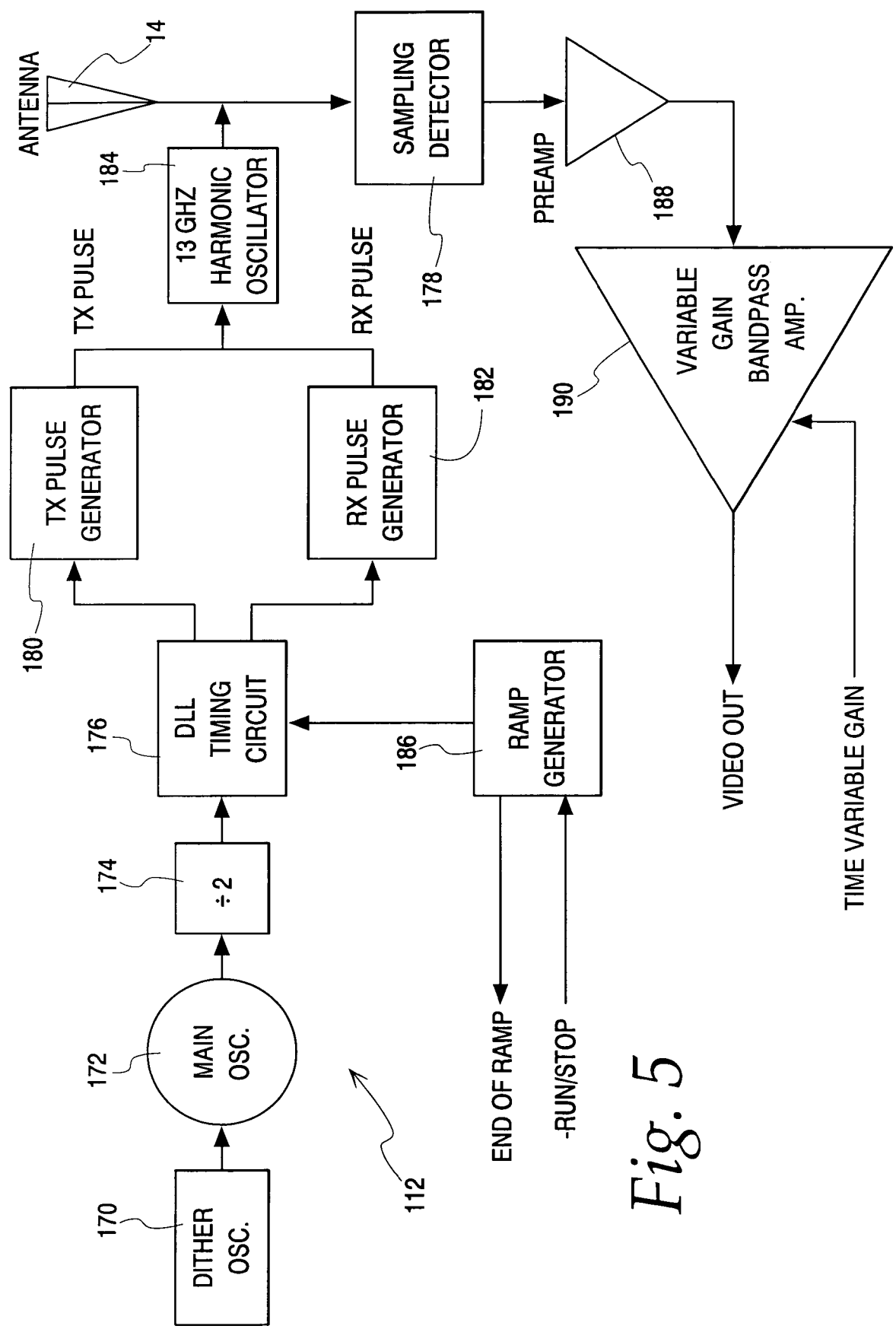
FIG. 5 is a block diagram of a circuit on the RF transceiver circuit board.

A block diagram of circuitry of the RF board block 112, which circuitry is on the transceiver circuit board 58, is illustrated in block diagram form in FIG. 5.

Figure 6:
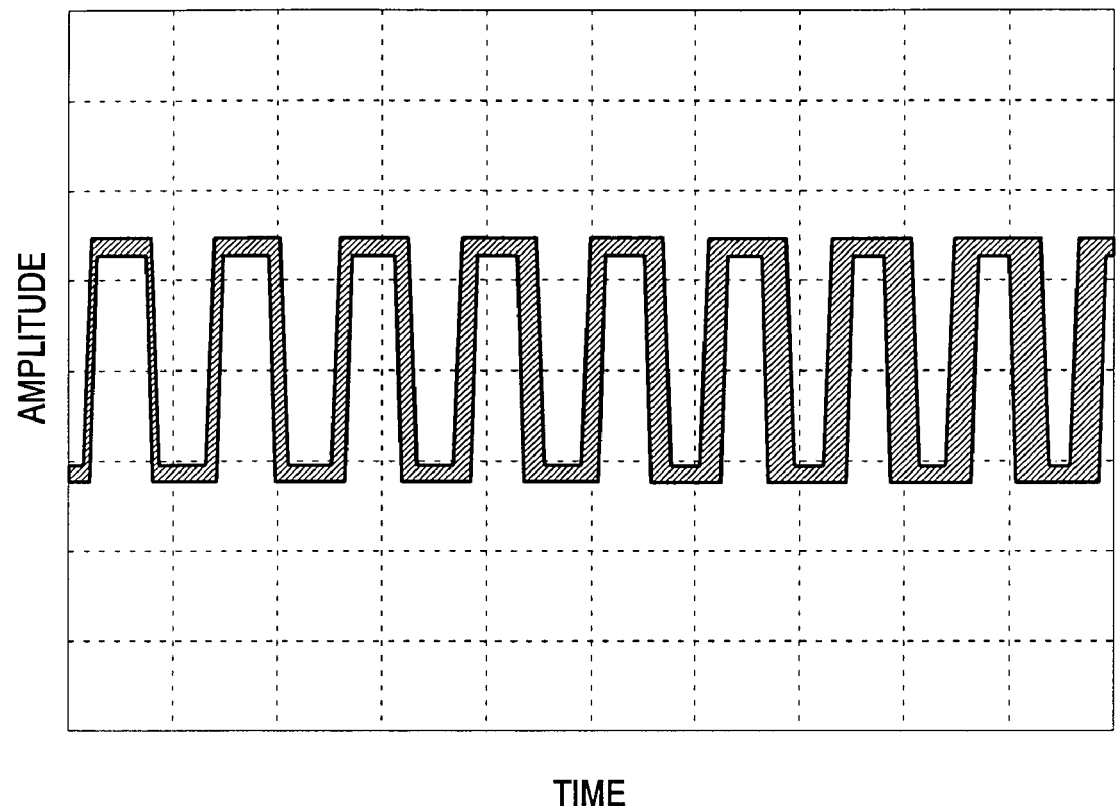
FIG. 6 is a plot of a dither oscillator waveform.

A dither oscillator circuit 170 generates a "noisy" square wave of about 500 KHz frequency. The noise/jitter may in a range of about 20% to about 50%. In other words, the edges of the wave form have significant but random timing jitter. FIG. 6 illustrates of plot of an example of the noisy square wave signal. The noisy square wave in this scope plot is indicated by the progressively thicker vertical parts of the trace when going from left to right. The thick vertical lines are caused by noise-induced timing jitter in the square wave signal. A "clean" square wave would have thin vertical segments all across, similar to the first one (leftmost) in the waveform. It is this timing jitter that varies the timing of the transmit pulses, as discussed in greater detail below. This signal is used to randomly modulate the timing of a main oscillator 172. The main oscillator 172 is a crystal controlled oscillator with a typical frequency in the 3-5 MHz range. In an illustrated embodiment of the invention, the frequency is 3.6864 MHz. The timing of the oscillator transitions is modulated randomly by the dither oscillator 170. A divide-by-two circuit 74 produces a pulse repetition frequency (PRF) of 1.8432 MHz. This is done to reduce the power requirement in delay locked loop (DLL) logic gates. A DLL timing circuit 176 generates a precise, controlled timing delay between two logic transitions, referred to as transmit, or TX, pulse and receive, or RX, pulse. The transitions are on the order of 0 to approximately 100 nanoseconds, according to the value of a ramp signal input from a ramp generator 186. The delay lock loop in conjunction with a sampling detector 178 performs the function of equivalent time sampling on the transmitted RF signal in accordance with previous, well known designs.

A transmit pulse generator 180 and a receive pulse generator 182 are controlled by the DLL timing circuit 176 and use a single high-frequency switching transistor to generate a very fast, less than one nanosecond, pulse to excite a harmonic oscillator 184. The TX pulse creates the transmit pulse out the antenna 14 towards the radar target, such as a liquid level surface. The RX pulse is delayed from the TX pulse by an amount determined by the ramp generator 186 and the DLL timing circuit 176. The purpose of the RX pulse is to gate the sampling detector 178 and listen for TX pulses which have been reflected by a distant target, and have returned to the antenna 14 after a delay dependent on the target distance.

The harmonic oscillator 184 represents a Colpitts oscillator comprised of a high frequency HJFET and tuned via microstrip resonators to oscillate at approximately 13 GHz while being rich in second harmonic (26 GHz) content. It is primarily the 26 GHz component that is transmitted. This allows the use of smaller antennas which achieve smaller radiated beam widths.

The antenna 14 is not electrically connected to the RF board 112. Instead, the antenna 14 uses an antenna horn 33 that is placed over the oscillator transistor and microstrips of the harmonic oscillator 184, as generally depicted in FIG. 3, whereby the RF energy from the harmonic oscillator 184 is directly coupled into the antenna horn 33 after radiating directly from the circuit elements themselves. As is apparent, a wave guide could also be used with, or instead of, the antenna horn 33.

The sampling detector 178 comprises a microwave diode that is placed inside the antenna horn 33 proximate the harmonic oscillator 184. TX pulses that are reflected by the liquid surface are received by the antenna 14 and conducted to the sampling diode 178 where they are mixed and detected with the delayed RX pulse to perform the equivalent time sampling function. A preamp 188 comprises a fixed gain stage to amplify signal from the sampling detector 178. A variable gain bandpass amplifier 190 comprises a bandpass amplifier tuned to the frequency of the video or down-converted signal which is a result of the equivalent time sampling process. Also, the amplifier 190 provides a variable gain, as controlled by the signal "time variable gain". In radar, since the strength of echoes decreases with increasing distance, a time variable gain circuit is used to increase the gain of the receiver with increasing distance from the transmitter to offset the effect of diminishing radar signal strength with distance.

The circuitry on the transceiver circuit board 58 operates to generate the transmission signal and the signal is launched directly from the transceiver circuit board 58. The RF signal is generated on the transceiver circuit board 58 directly into the antenna horn 33 without the need of multiple intermediate components.

In accordance with the invention, the RF board 112 provides dithering of the transmit pulses, while maintaining precise timing between transmit pulses and associated receive pulses. Particularly, the PRF is determined from the main crystal oscillator 172. The timing is very precise. For sampling, it is necessary to have high accuracy. However, the desire is to ignore returns from prior transmit pulse cycles. This is done by uncorrelating the transmit pulses. The PRF is modulated by white noise from the dither oscillator 170. As such, the sample pulse read by the sampling detector 178 has to be perfectly correlated to the associated transmit pulse. The transmit and receive pulses in a cycle are a locked pair, with the timing of each cycle being random. The noise modulates the transmit and receive pulses in pairs. As a result of this, pulses that live in to the next cycle are not correlated with the transmit pulses of that previous cycle. The randomizing causes the non-correlated pulses to average to zero so that they effectively disappear. Thus, the system effectively only detects pulses resulting from the original pulse. This eliminates problems associated with tank rattle.

Figure 7:
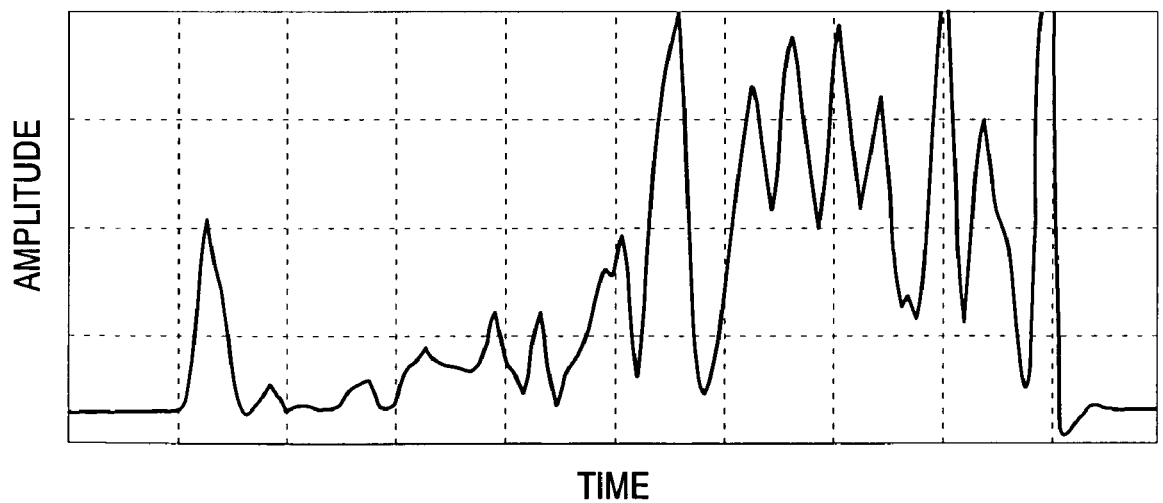
FIG. 7 is a plot of a radar return signal under tank rattle conditions.
Figure 8:
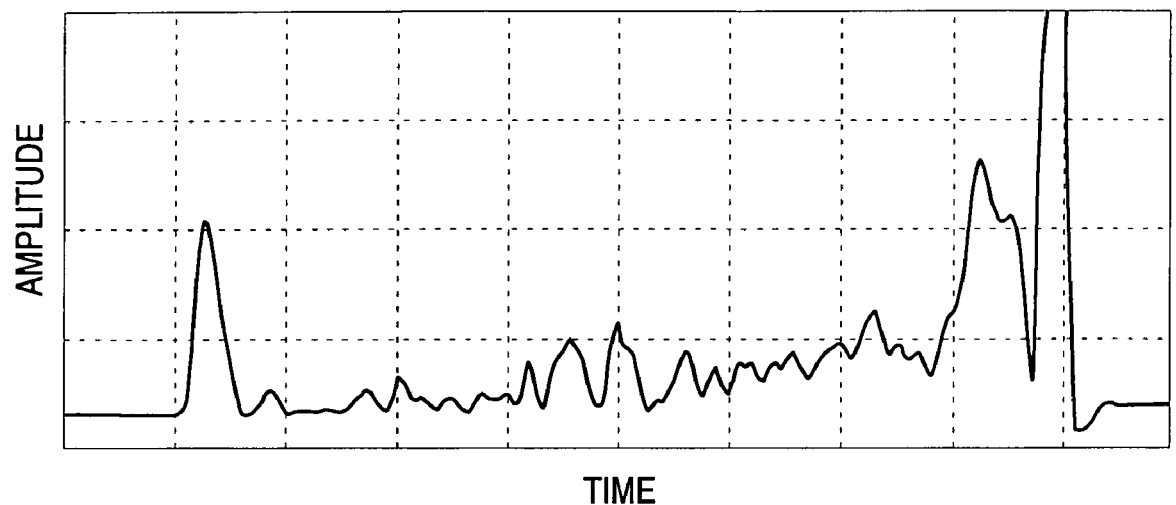
FIG. 8 is a plot of a radar return signal with 25% dithering in accordance with the invention.
Figure 9:
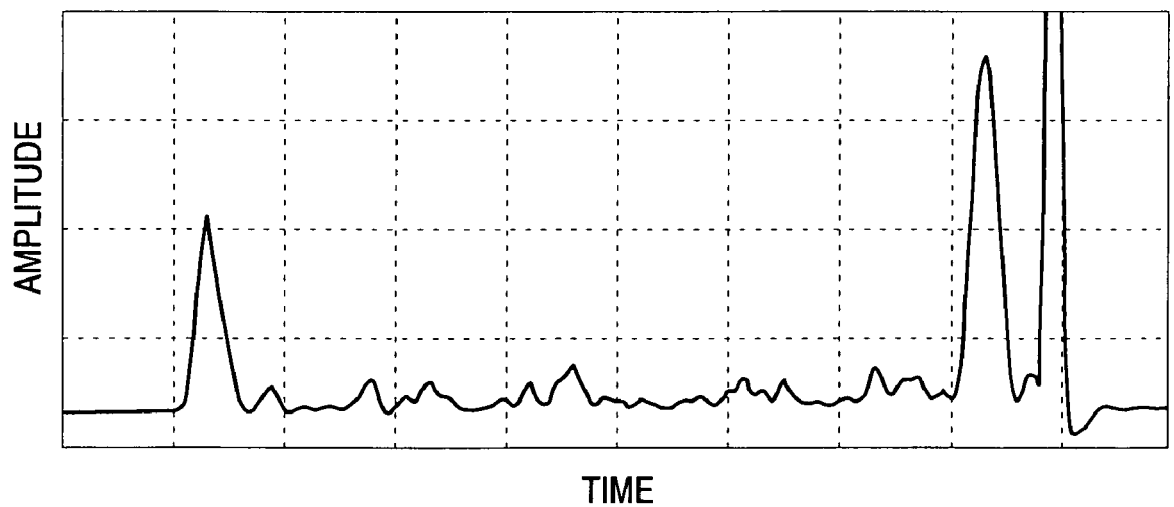
FIG. 9 is a plot of a radar return signal with 50% dithering in accordance with the invention.

As discussed above, the plot of FIG. 7 illustrates a radar return signal of an empty tank evidencing tank rattles when dithering is not used. FIG. 8 illustrates the radar return signal with dithering of about 25% (+/−1.25 ns jitter). There is still some evidence of tank rattles, but at a much lower level and the tank bottom signals begin to emerge. FIG. 9 illustrates the radar return signal with dithering of about 50% (+/−2.5 ns jitter). The baseline is "quieter" and the bottom echo is large and clean. Dithering above about 50% may result in loss of target amplitude with little change in the baseline. Tests thus suggest dithering in a range of about 20% to 50% as a desirable range.

In the illustrated embodiment of the invention, an electromagnetic radiating element comprises the transistor and microstrip resonators of the harmonic oscillator 84. The invention is not limited to such radiating element, but could alternatively use other elements, such as a loop launcher or the like. Moreover, the characteristics of the propagation signal described herein are by way of example only. The invention is not intended to be limited to any particular frequency or wavelength.

Thus, in accordance with the invention, there is provided an improved through air radar level process control instrument suing pulse dithering to minimize inaccuracies caused by tank rattle.

I claim:

1. A through air radar level measurement instrument for use in minimizing tank rattle comprising:
    a housing;
    an antenna secured to the housing;
    a process adapter associated with the antenna and the housing for securing the instrument to a closed tank with the antenna directed into an interior of the closed tank; and
    a control in the housing for generating or receiving a high frequency signal using an electromagnetic radiating element proximate the antenna, the control comprising an equivalent time sampling circuit including a main oscillator driving a timing circuit controlling timing between transmitted and sampled pulses, and a noise generator operatively associated with the main oscillator to randomly modulate timing of the main oscillator, wherein the control minimizes inaccuracies caused by tank rattle.

2. The through air radar level measurement instrument of claim 1 wherein the noise generator comprises a dither oscillator.

3. The through air radar level measurement instrument of claim 2 wherein the dither oscillator generates a noisy square wave.

4. The through air radar level measurement instrument of claim 3 wherein the square wave includes dither in a range of about 20% to 50%.

5. The through air radar level measurement instrument of claim 1 wherein the timing circuit comprises a delay lock loop.

6. The through air radar level measurement instrument of claim 5 wherein the delay lock loop is operatively associated with a sampling detector to perform the function of equivalent time sampling.

7. The through air radar level measurement instrument of claim 1 wherein the radiating element comprises an oscillator circuit including microstrip resonators.

8. The through air radar level measurement instrument of claim 1 wherein the antenna comprises a horn antenna.

9. The method of eliminating tank rattle inaccuracies in a through air radar level sensor comprising:
    providing a housing, with an antenna secured to the housing and a process adapter associated with the antenna and the housing for securing the sensor to a closed tank with the antenna directed into an interior of the closed tank;
    generating and receiving a high frequency signal using an electromagnetic radiating element proximate the antenna, comprising providing an equivalent time sampling circuit including a main oscillator driving a timing circuit controlling timing between transmitted and sampled pulses, and generating noise to the main oscillator to randomly modulate timing of the main oscillator to minimize inaccuracies caused by tank rattle.

10. The method of eliminating tank rattle inaccuracies in a through air radar level sensor of claim 9 wherein generating noise comprises providing a dither oscillator generating a noisy square wave.

11. The method of eliminating tank rattle inaccuracies in a through air radar level sensor of claim 10 wherein the square wave includes dither in a range of about 20% to 50%.

12. The method of eliminating tank rattle inaccuracies in a through air radar level sensor of claim 9 wherein the equivalent sampling circuit comprises delay lock loop and a sampling detector to perform the function of equivalent time sampling.

13. The method of eliminating tank rattle inaccuracies in a through air radar level sensor of claim 9 wherein generating and receiving a high frequency signal comprises providing dithering of transmit pulses of different cycles, while maintaining precise timing between transmit pulses and associated receive pulses in a given cycle.

14. The method of eliminating tank rattle inaccuracies in a through air radar level sensor of claim 13 wherein maintaining precise timing between transmit pulses and associated receive pulses in a given cycle comprises providing a main oscillator.

15. The method of eliminating tank rattle inaccuracies in a through air radar level sensor of claim 14 wherein providing dithering of transmit pulses of different cycles comprises providing a dither oscillator so that timing of oscillations from the main oscillator is randomized by the dither oscillator.

16. A through air radar level sensor for use in minimizing tank rattle comprising:
a housing;
an antenna secured to the housing;
a process adapter associated with the antenna and the housing for securing the instrument to a closed tank with the antenna directed into an interior of the closed tank; and
a control for generating and receiving a high frequency signal using an electromagnetic radiating element proximate the antenna, the control comprising an equivalent time sampling circuit including a main oscillator driving a timing circuit providing precise timing between transmitted and sampled pulses in a cycle, and a noise generator operatively associated with the main oscillator providing dithering of transmit pulses of different cycles to minimize inaccuracies caused by tank rattle.

17. The through air radar level sensor of claim 16 wherein the noise generator comprises a dither oscillator generates a noisy square wave.

18. The through air radar level sensor of claim 17 wherein the square wave includes dither in a range of about 20% to 50%.

19. The through air radar level sensor of claim 16 wherein the timing circuit comprises a delay lock loop is operatively associated with a sampling detector to perform the function of equivalent time sampling.

20. The through air radar level sensor of claim 16 wherein the radiating element comprises an oscillator circuit including micro strip resonators.

* * * * *